May 12, 1959  M. VON ARDENNE  2,886,728
ELECTRON-OPTICAL DEVICE
Filed Jan. 24, 1956
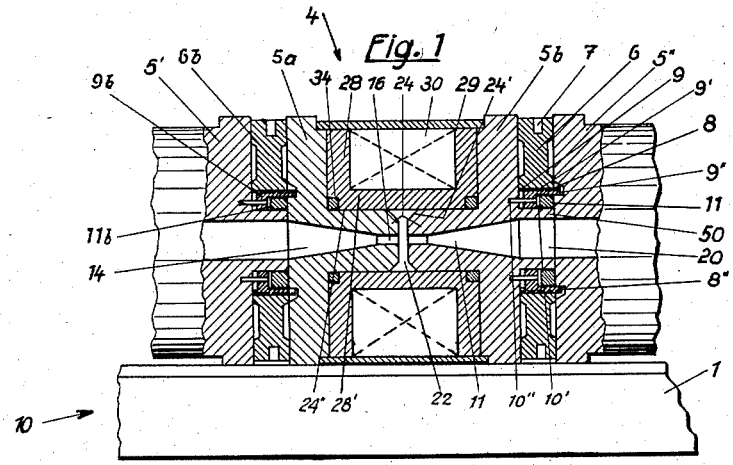
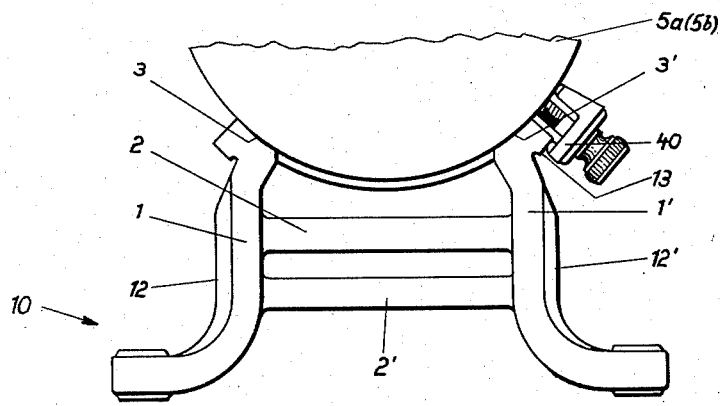
INVENTOR.
Manfred von Ardenne

United States Patent Office 2,886,728
Patented May 12, 1959

---

2,886,728

ELECTRON-OPTICAL DEVICE

Manfred von Ardenne, Dresden-Weisser Hirsch, Germany, assignor to VEB Vakutronik Dresden, Dresden, Germany Application January 24, 1956, Serial No. 561,022

Claims priority, application Germany June 2, 1955

7 Claims. (Cl. 313—84)

The present invention relates to an electron-optical device, and more particularly to an electron-optical bench.

It is an object of the present invention to render the individual structural elements of the bench interchangeable without changing the position of the other structural elements.

It is another object of the present invention to render the elements interchangeable without incurring a great loss of time.

It is a further object of the present invention to render the elements interchangeable while maintaining the adjustment of the not interchanged elements.

It is still another object of the present invention to simplify the design of electron-optical benches.

Other objects and advantages of the present invention will be apparent from the following detailed description thereof in connection with the accompanying drawings showing, by way of example, some embodiments of the present invention. In the drawings Fig. 1 is a partial side elevation, partly shown in section, of a preferred embodiment of the present invention, with the feet of the device omitted, Fig. 2 is an end elevation on a smaller scale of the device shown in Fig. 1.

Referring now to the drawings and first to Figs. 1 and 2, an electron-optical bench generally denoted by the referene numeral 10 comprises a member including a pair of preferably cast iron rails 1 and 1' which are connected by transverse ribs 2, 2' in order to prevent any changes of the relative position of the rails 1, 1'. It should be noted that beside the transverse ribs 2, 2' only end ribs such as 12 and 12' are required for imparting the necessary strength to the bench 10 so that the major part of the length of the lower side of the bench 10 is free for arranging vacuum lines and cables (not shown) to the structural elements.

As shown in Fig. 2 the upper parts 3, 3' of the rails 1, 1' are formed as beds or bearings for a plurality of structural elements generally denoted by 4 and preferably designed as hollow parts or drums 5a and 5b. The bearing surfaces of the beds 3, 3' are provided with faces being machined according to the outer diameter of the parts such as 5a and 5b whereby an exact fitting of these parts to the bearings 3, 3' is achieved so that the elements such as 4 have a common optical axis. The beds 3, 3' are provided with milled faces such as 13 which extend over the entire length thereof; clamps such as 40 are secured to the parts such as 5 and 5b and cooperate with the milled faces such as 13 so as to enable the elements such as 4 to be clamped to the bearings 3, 3' at any desired place.

It should be noted that the individual structural elements such as 4 may be individually inserted into, or taken out of, the assembly without disturbing and/or changing the positions of the other elements which are already adjusted. This is achieved in the following manner:

A clearance of a few hundredths of a millimeter exists generally between two consecutive parts of structural elements such as 5', 5b and 5a, 5" which are shown in Fig. 1. The structural element 4 is a magnetic pole piece lens to be more fully explained hereinafter. An exchange of the elements such as 4 shown in Fig. 1 is rendered possible by means of the special seal between the elements which will now be described in detail.

Each structural element or drum such as 4 is provided at one side thereof, in Fig. 1 shown as the right side, with a rotatable hollow body or wheel 6 having a boring 7 in the outer rim portion thereof for insertion of a key (not shown) for effecting a slight rotation of the wheel 6 with respect to the part 5b. On the side of the wheel 6 turning away from the part 5b the drum 5" is provided with a circular recess 8" which is in engagement with an extension 9" of a ring 9 having an outer thread 9' engaging a similar thread provided on the inner curved surface of the wheel 6. A pin 10" projects from the ring 9 into a corresponding recess of the part 5b so as to secure the ring 9 against rotation with respect to the part 5b. The ring 9 has a recess 10' in which a rubber ring 11 is supported.

The operation of this device is as follows:

If the wheel 6 is given a slight rotational movement in one direction against the part 5b by means of the key (not shown) inserted into the boring 7, the movement of the wheel 6 is transferred by the screw connection 9' as a lateral movement of the ring 9 directed toward the wall of the drum 5", the projection 9" sliding in the recess 8" of the drum 5". At the same time the rubber ring 11 is compressed so as to establish a vacuum tight seal between the hub portion 50 of the part 5b and the drum 5". When conversely the wheel 6 is rotated in the opposite direction against the part 5b, the rubber ring 11 is decompressed and the vacuum tight seal between the hub portion 50 of the part 5b and the drum 5" is released. At the same time the ring 9 is moved to the left as seen in Fig. 1 so that the extension 9" is moved out of the circular recess 8" of the drum 5". After performing the analogous operations for the wheel 6b the ring 9b, and the rubber ring 11b arranged on the left side of the element 4, the same is free from the drums 5' and 5" so that it may be removed as a whole.

The elements such as 4 are provided with inner borings forming an evacuated space. For instance, the axial boring of the element 4 forming a magnetic pole piece lens includes a first conical boring 14, a second conical boring 18, a cylindrical portion 16 being in communication with the smaller ends of the conical borings 14 and 18, and a cylindrical boring 20 surrounded by the hub portion 5a of the part 5b and being connected with the larger end of the conical boring 18.

The space 22 in the middle of the borings 14 and 18 is formed by the gap between the plane end surfaces of the pole pieces 24 consisting of magnetizable material such as iron. In the space or gap 22 the field of the lens is formed. The pole pieces 24 have exterior surfaces formed conically in the parts 24' thereof joining the plane end surfaces, and cylindrically in the parts 24" thereof joining the conical parts 24'. The pole pieces 24 are fitted very exactly into the boring of the annular middle portion 28' of a part 28 consisting of non-magnetic material. The part 28 forms the outer limit of the winding space 30 for the operating winding (not shown) of the magnetic pole shoe lens 4 and is provided with two recesses for accommodating rubber sealing rings 34. An outer member 29 being shaped as an iron tube serves for closing the magnetic circuit.

In order to degas the system described hereinabove, the entire vacuum tube system of the bank or part of the same is heated to a temperature of approximately 250° C. In doing so preferably a sealing agent is used consisting of a material capable of withstanding high temperatures, such as silicone rubber. The sealing rings 34 take into consideration the properties of silicone rubber and are to be exchanged after one single use. Preferably the coils (if any) contained in the structural elements are wound from a material capable of withstanding the increased temperature; for instance, the coils (not shown) are wound from eloxadized aluminum wire.

The vacuum system to be heated including, if desired, the optical bench, or the individual parts thereof may be insulated against heat by porcelain holding pieces or tubes, or thin walled intermediate pipes consisting of German silver or nickel silver.

Thus it is seen that the electron-optical bench according to the invention allows an individual structural element thereof to be taken out and to be replaced individually without changing the positions of the elements not to be exchanged.

The clamps 40 are arranged on every structural element such as 4 either in sets of two or four in corresponding positions so as to allow a clamping of the elements at any place to the iron legs or rails 1, 1'.

I have described hereinbefore preferred embodiments of an electron-optical bench. However, I wish to be understood that numerous changes, substitutions of equivalents, and modifications may be made in the embodiment described hereinabove, without departing from the scope and gist of my invention.

I claim:

1. An electron-optical device comprising a common support member, a plurality of contiguous hollow structural elements supported by said member, said elements having cylindrical bearing surfaces of the same uniform outside diameter, said member having a concave cylindrical bearing surface in contact with and of the same diameter as the bearing surfaces of said elements, said surfaces being coaxially arranged relative to an electron-optical axis, means mounted at the contacting surfaces of two contiguous elements for connecting and hermetically sealing the contacting surfaces together, means for adjusting the connecting and sealing means in an axial direction for engaging and disengaging contiguous elements, whereby said elements can be moved or replaced without disturbing or changing the position of adjacent elements.

2. A device as claimed in claim 1, said elements having hubs at one end thereof and said sealing and connecting means including axially movable and resilient sealing rings arranged on cylindrical outer surfaces of said hubs, and axially displaceable rigid auxiliary rings for pressing said sealing rings against the sealing surfaces of adjacent elements to effect sealing.

3. A device as claimed in claim 2, a rotatable body having an internal screw thread, one of said rigid rings being arranged inside each hollow body and supporting the same, said rigid ring having a thread engaging the thread of said body.

4. A device as claimed in claim 3, said one of said contiguous elements having a recess engaged by said rigid ring.

5. A device a claimed in claim 4, and a pin connected with said rigid ring, said pin engaging a recess in the other of said contiguous elements so as to secure said threaded ring against rotation.

6. An electron-optical device, comprising, in combination, a pair of rails, a plurality of hollow drums supported by said pair of rails, a plurality of clamps releasably connected to each drum, said clamps fastening each hollow drum on said pair of rails supporting the same, and at least one cross rib securing said rails against changes of position, said rails having cylindrical concave faces supporting said drums, said faces being machined according to the outer diameter of said drums so as to form supporting surfaces therefor and means including axially compressible sealing rings for hermetically connecting a drum to adjacent drums and for enabling each drum to be disconnected from the adjacent drums and removed without moving the other drums.

7. A device as claimed in claim 6, a member mounted on the opposite faces of each drum, and sealing means arranged between said member and said drum, said sealing means being able to withstand elevated temperatures.

References Cited in the file of this patent

UNITED STATES PATENTS

| 2,267,137 | Ruska et al. | Dec. 23, 1941 |
| 2,356,633 | Von Ardenne | Aug. 22, 1944 |
| 2,445,243 | Runge | July 13, 1948 |
| 2,457,092 | Simard et al. | Dec. 21, 1948 |
| 2,649,313 | Burger et al. | Aug. 18, 1953 |

FOREIGN PATENTS

| 720,178 | Germany | Apr. 27, 1942 |